United States Patent [19]

Fucik

[11] Patent Number: 5,162,403
[45] Date of Patent: Nov. 10, 1992

[54] PHENOLIC RESIN PREFORMS AND METHOD OF MANUFACTURING THEM

[75] Inventor: I. Thomas Fucik, Vienna, Austria

[73] Assignee: Reichhold Chemie GES.M.B.H., Vienna, Austria

[21] Appl. No.: 474,826

[22] PCT Filed: Dec. 5, 1989

[86] PCT No.: PCT/AT89/00116

§ 371 Date: Aug. 2, 1990

§ 102(e) Date: Aug. 2, 1990

[87] PCT Pub. No.: WO90/06338

PCT Pub. Date: Jun. 14, 1990

[30] Foreign Application Priority Data

Dec. 6, 1988 [AT] Austria .................................. 2988/88

[51] Int. Cl.$^5$ .......................... C08K 3/22; C08K 3/36; C08K 5/09; C08L 61/06
[52] U.S. Cl. ...................................... 524/6; 524/291; 524/321; 524/417; 524/433; 524/437
[58] Field of Search .................... 524/6, 291, 321, 417, 524/433, 437

[56] References Cited

U.S. PATENT DOCUMENTS

| | | | |
|---|---|---|---|
| 2,883,352 | 4/1959 | Sorge | 523/168 |
| 3,216,966 | 11/1965 | Collins et al. | 524/6 |
| 3,317,327 | 5/1967 | Matsuda et al. | 524/6 |
| 3,502,610 | 3/1970 | Thompson | 524/650 |
| 3,655,609 | 4/1972 | Evans et al. | 524/6 |
| 3,663,720 | 5/1972 | Thompson | 524/6 |
| 3,944,515 | 3/1976 | Foley et al. | 524/6 |
| 4,003,873 | 1/1977 | Smith | 524/6 |
| 4,417,925 | 11/1983 | Cherry | 524/6 |

FOREIGN PATENT DOCUMENTS

| | | | |
|---|---|---|---|
| 0069754 | 4/1983 | Japan | 524/6 |
| 0893951 | 12/1981 | U.S.S.R. | 524/6 |
| 1070127 | 1/1984 | U.S.S.R. | 524/6 |

OTHER PUBLICATIONS

I. T. Fucik, "Phenolic Compounds Especially for SMC with Controlled B-Stage", delivered at the Society of the Plastics Industry 45th Annual Conference in Washington, D.C. on Feb. 15th, 1990.

Abstract published in News Survey, No. 4/92, page 8.

*Primary Examiner*—Paul R. Michl
*Assistant Examiner*—Peter Szekely
*Attorney, Agent, or Firm*—Spencer, Frank & Schneider

[57] ABSTRACT

Premoulding materials having long-term controllable B-stage characteristic, comprising phenol resins, optionally with reagents, additives and adjuvants, are characterized in that they contain hydraulic binder and/or its components as well as an agent that reduces the alkalinity and optionally the content of free metal ions. For its preparation, 1 part by wt. phenol resin is mixed with less than 4 parts by wt. of a hydraulic binder and/or its components as well as less than 0.2 equivalent parts by weight of the agent. The phenol resin premoulding materials according to the invention thicken quickly to a desired B-stage, are capable of maintaining the attained plateau, and thus allow the manufacture of heat-curable composites of desired rheology and reactivity.

14 Claims, No Drawings

PHENOLIC RESIN PREFORMS AND METHOD OF MANUFACTURING THEM

The invention relates to phenol resin pre-moulding materials (intermediates) having a controlled B-stage, which cure under the influence of heat and, advantageously, under pressure, and also to a process for their preparation.

Pre-moulding materials of phenol resins having a long-term adjustable B-stage characteristic, optionally with reagents, additives and adjuvants, which are characterised in that they contain hydraulic binders and/or their components as well as an agent for reducing alkalinity and optionally the content of free metal ions, are a particular object of this invention.

Duroplast pre-moulding materials have long been known. They are moulding material primers in the B-stage, which are more or less stable moulding materials comprising thickened reactive mixtures of the moulding material starting components. They generally comprise few volatile components, and can be worked directly to finished parts, for example by pressmolding. They are prepared as compounds of prematrix and reinforcing material. The prematrix (paste) principally comprises reaction or condensation resin and reagents, for example hardener, catalyst, thickener, optionally in admixture with additives such as fillers, pigments, plasticisers and adjuvants, e.g. internal release agents, lubricants, wetting agents. The reinforcing material conventionally comprises fibrous structures, for example cut glass fibers. The thickening or maturation or rather the attainment of the corresponding B-stage follows relatively quickly, and is usually conducted thermally. The resultant material is pseudo-stable, and its applicability is limited. The storage of such products is associated with further, but slower continuation of the thickening. The pre-moulding materials become drier and harder. Longer storage at room temperature can lead, for example, to extensive hardening. BMC-amorphous pre-moulding materials, prepeg cloth pre-moulding materials and SMC (sheet moulding compounds)-mats pre-moulding materials serve as examples.

The B-stage of such pre-moulding materials exhibits a stage, in which the prematrix of the pre-moulding material, preferably on the basis of a defined increased molecular weight of its reaction or condensation resin component, exhibits a definite limited rheology and, as the case may be, autohesion.

The reaction- or condensation resins are no longer fluid, in this state. They are however soluble and meltable. The prematrix can be substantially solid. Usually, however, it becomes putty-like to somewhat wax-like, and the pre-moulding material has a kneadable to oil cloth consistency. On hotpressmoulding, such B-stage materials behave in such a manner that their prematrix flows under the influence of heat and pressure, reimpregnates and transports the reinforcing material, conveys eventual gas components, fills the relevant mould space and then gels on reaching the appropriate temperature and cures to a form-giving part of the moulded item. The gelling, at the desired end point of the transport phenomenon of the moulded mass in the implement, is characterised by a formation of local networks which largely change to complete cross-linking on curing.

The B-stage thus exhibits a quantity characteristic of the material state, whose thickening rate, level and stability are of essential importance both for the preparation and workability of the pre-moulding materials and for the quality of the resultant parts. The B-stage determines the handability of the pre-moulding material (important in complex mould tool geometry), affects the density of the relevant laminate moulding stack (significant for intra- and inter-laminar strengths) and is also decisive as regards the possibility of manufacturing moulding stacks for stock (significant in mass production). The B-stage is relevant for the storage stability of the pre-moulding materials and important for their flow properties on compression moulding.

It decisively influences the pressure profile structure over the pre-moulding material mass in the compression moulding process, and has a substantial influence on the distribution of the reinforcing material in the moulding.

The reaction behaviour of the pre-moulding materials, which is important for curing, and hence also the physical properties of the finished articles, are likewise influenced by the B-stage and its quality.

The problems associated with pre-moulding materials are therefore, in particular the reaction or condensation resin systems for the manufacturing of the composites must have a relatively low viscosity (they must permit good impregnation rheology of the appropriate premix, in order that the predominantly fibrous and more often bundle-shaped reinforcing material can be well impregnated), but they must nevertheless lead to prematrix systems which thicken quickly and as desired, the thickened stage that is reached should be largely stable, so that the B-stage exhibits a defined long-term characteristic, and the curing should take place in a technologically favourable manner.

While the initial thickening and curing of the pre-moulding materials is relatively controlled and can be conducted in many ways, the preparation of such pre-moulding materials with defined, largely stable B-state often succeeds insufficiently or only approximately.

The pre-moulding materials must usually be worked quickly, in practice, or stored at relatively low temperatures.

A satisfactory solution, of the problem of the B-state stability of pre-moulding materials based on phenol resins, remains largely open until now despite various attempts.

For example, US-A-3502610 proposes moulding materials based on phenol-formaldehyde resin, which contain 2–6 wt.% of a hydraulic cement. The cement is here introduced as a regulator of the compound rheology (viscosity reducer) and as an improver of the temperature stability as well as a source of fire-inhibiting properties.

However, such solutions are insufficient, with respect to the B-state stability. The use of the cement in such systems leads to an increase in the heat-stability and to a positive influence on the fire-resistance of the moulding materials, but a flat long-term plateau of the B-stage is not attained in this way. An increased cement concentration rather accelerates the thickening and reduces the storage time.

DE-A-2550779 again describes synthetic resin and condensation synthetic resin products, based on phenol-formaldehyde, phenol-aminoplast-formaldehyde, aminoplast-formaldehyde, resorcinol-formaldehyde or resorcinol-formaldehyde-urea and their condensates, which are prepared with 1–20 parts by wt. of a cement per part by weight of the water present in the products given above or used in their preparation. The cement should be used in stoichiometric amounts in this context, so that all water present originally in the system plus water of reaction are set free on hardening of the cement, and the cement thereby hardens the moulding material. A ceramic clay should be used as rheology regulator or flow regulator of the relevant pre-moulding materials.

Pre-moulding materials according to this Offenlegungsschrift exhibit improved mould flow characteristics and favourably-influenced mass transport, but their plateau viscosity is somewhat steep. The dehydrating effect of cement catalyses the condensation reactions of the resols that are present and the B-stage is depressed. Such primers are worked directly (without maturation). Their duration of storage is correspondingly short, only about three weeks. The stabilisation or the sufficient inhibition of the molecular growth of the matrix binding agents is not achieved in this way, and the compressed bodies thicken, relatively stressed. The technical parameters for use of such compressed bodies change quickly, and they require quick working. Advantages of the cement as additive and reactant are not utilised as fully as possible in this case.

It has already been proposed (CH-A-0624691), to prepare pre-moulding materials of phenol resin systems in photopolymerisable form. Such products do give moulding materials having somewhat longer B-stage characteristic, but they have the disadvantage that they are suitable only for non-filled, very thin, flat moulded bodies and require storage in the dark.

Similar disadvantages are associated with compounding materials that act as B-stage regulators and hardening catalysts with phenol resols in combination with organic acids released under the influence of light (DE-A-3317570).

Pre-moulding materials having radiation-hardenable binding agents have already been developed (EP-A-0168065). They do permit the preparation of composite primers having long-term stability, but they do not solve the problem of providing primers having adjustable B-stage-specific rheology and require storage in the dark, protected against radiation. They also have the disadvantage that they are only suitable for the preparation of laminar products, up to 10 mm thick.

It is also known to prepare compositions of phenol resins for the production of pre-impregnated resin mats comprising phenol-formaldehyde-resols having hardeners and corresponding fillers with the admixture of an additive that contains at least 20 wt. %, based on the total weight of the additive, of an alkali or alkaline earth metal borate, optionally in combination with alkaline earth metal oxides, and is introduced in an amount of no more than 60 wt. %, based on the phenol resin solution that is used (EP-A-0176378, EP-A-0220105).

Finally, relevant compositions of phenol resins with an additive that contains triethanolamine borate or a mixture of an amine and a boron oxide, are also known (EP-A-0249517).

Among the primers of the moulding materials prepared in the art described above, the composite articles based on unsaturated polyester resins have similar strengths and are characterised by favourable burning properties and high hot mould stability. The primers however exhibit a relatively steep B-stage plateau. Their storage stability is about two months at room temperature, at which they nevertheless become increasingly drier and harder. Even for these relatively well-developed pre-moulding materials, the long-term B-stage characteristic described above is attained only to an unsatisfactory extent. Further, on working such materials, the hardening catalyst can lead to corrosion of the relevant implements.

The object of the present invention is therefore to provide phenol resin pre-moulding materials that have a defined and quickly-attainable B-stage plateau having a flat pattern, that have good hardening characteristics and that overcome the disadvantages described above.

The solution of this problem is achieved by means of phenol resin pre-moulding materials or with a process having the characteristics given in the patent claims.

It has been found that pre-moulding materials comprising phenol resins, optionally with reagents, additives and adjuvants, in combination with hydraulic binders and/or components as well as with an agent for reducing the alkalinity and optionally the content of free metal ions, can thicken quickly to a desired B-stage, maintain the plateau thus reached, and thus allow the preparation of heat-hardenable composites having desired rheology and reactivity.

Phenol resins that are used for the production of such pre-moulding materials according to the teaching of the invention, are fluid, preferably neutral or weakly alkaline products of the primarily alkaline-catalysed condensation of aldehydes with phenol, cresol, resorcinol, xylenol and the like, that can exhibit modification, e.g. with furan resins or other higher molecular weight systems. Phenol-formaldehyde condensates having a molar ratio of phenol to formaldehyde of at least 1:1, preferably 1:1.2–2.0, are particularly suitable. These condensation resins provide, in the pre-moulding materials, the object of a thickenable binding agent that acts predominantly for the form-giving primary components in the finished moulding materials.

As hydraulic binders, hydraulic cements, cement products, high alumina-containing hydraulic binders and all calcium and magnesium oxide-containing curing materials are used in an amount of less than 20 parts by wt. per 1 part by wt. resin. Preferably, 15–150 parts by wt of a hydraulic binder or 1–15 parts by wt. of its alkaline earth metal oxide are introduced individually or unmixed, per 100 parts by wt. resin components.

The desired hydraulic cements are finely-ground hydraulic binders for mortar and concrete, comprising essentially silicon oxide, aluminium oxide, aluminium hydroxide, calcium oxide, magnesium oxide and iron oxide, in particular in calcium silicate, calcium aluminate and calcium ferrite form, that harden when mixed with water (hydration). In the desired pre-moulding materials, the cement functions as thickener, filler, water-absorber, catalyst, migration agent, flame inhibitor, pigment and reducer of the volatile components.

The high alumina-containing hydraulic cements described above are alumina cements characterised by especially high calcium aluminate content. Their alumina content generally lies in the range between 50 and 80 wt. %. Examples are Secar 50, Secar 71, Secar 80, from the company Lafarge Fondu International, France.

Added components of the hydraulic binder include, e.g. mixtures of calcium oxide and/or magnesium oxide with hydraulic additives or mixtures of cement with hydraulic additives. Hydraulic additives have no binding effect alone, without calcium oxide and/or magnesium oxide, but they contain components which harden at ambient temperature with, e.g. lime in the presence of water. Hydraulic additives are predominantly silicic acid- and alumina-containing, finely-ground products from volcanic tuff. An example is Trass from the company Rhein-Trass GmbH, Federal Republic of Germany. Individual components of the hydraulic cement are, e.g. magnesium oxide or calcium oxide.

As agents for reducing the alkalinity and optionally the content of free metal ions, compounds are used that neutralise a high alkalinity of the system, remove any excess amount of multivalent metal ions of the relevant system, and can inhibit the fast increase of the molecular weight of the relevant cement. For this purpose it is possible to use e.g. salicylic acid, monosodium phosphate, oxalic acid and the like. The amount of the agent that is introduced is desirably such that the value of the ratio of the number of acidity equivalents of the agent in the system to the number of moles of water in the system is less than 2. Preferably, the ratio lies between 0.2 and 0.05.

The function of the agent in the prematrix of the pre-moulding material according to the invention depends in particular on the influence of the rate of increase of the molecular weight of the relevant condensation resin by controlled salt and adduct formation, in particular by changes in the type and concentration of the system electrolytes as well as by reduced basic catalysis. An especial role is attributed to the pH control.

Surprisingly, it has now been shown that, by means of such an agent, the further thickening of the condensation resin in consequence of the conventionally favoured condensation by means of the dehydration agent, in particular cement, the condensation promoter, is apparently inhibited. Further, it can be established, surprisingly, that the prematrix system according to the invention exhibits faster curing on heat-compression despite inhibited reactivity during storage. Prematrix systems or premoulding materials having long-term B-stage characteristic and good hardening capacity are thus obtained.

For the B-stage-specific thickening of the relevant prematrix system, the following factors are particularly important: increase of the molecular weight of the reaction resin by salt- and adduct-formation (complex and chelate-formation) as well as by continuing condensation accompanied ion-exchanger-analogous sorption effects/with the formation of high molecular entities physical thickening by extending of the reaction resin with solids and partial setting of the hydraulic binder.

The thickening proceeds analogously to the prematrix viscosity and exhibits a structure parameter-related property for the characterisation of the prematrix rheology. This property is determined mathematically from the lateral spread of a sample according to the invention that is subjected to a displacement procedure under a defined pressure and over a predetermined time. It indicates, by how many percent the prematrix sample under test flows more slowly than a sample having a spread rate of 100 mm/min.

As additives, there can be used, e.g. fillers, plasticisers, dyes, stabilisers, hydrophobic agents, low profile additives and further materials added for the purpose of modifying the properties of the system.

As adjuvants, there can be added for example lubricants, release agents, wetting agents, aerating agents as well as other system components that facilitate or improve the working of the resultant composite articles and their precursors. The practical manufacture of the premoulding materials according to the invention from the starting materials is conducted by their thorough mixing in a manner such that, advantageously, first the phenol resol resin, the additives and adjuvants and then the reagents are combined, whereupon combination with the reinforcing material follows.

The addition of the hydraulic binder and/or its components and of the alkalinity-reducing agent can be conducted in the form of separate feeds or by the addition of a single mixture of the two main components. This mixture can be a pulverulent or, preferably, pasty state (reference powder or active filler paste or reference paste etc.).

The combination of the prematrix with the reinforcing material can be conducted in conventional manner, for example on an SMC-machine, by intensive mechanical thorough kneading of a sheet-like deposition of cut glass fibers between two prematrix films between two plastics sheets (preparation of P-SMC).

Another means of preparing the premoulding material comprises e.g. the combination of cut glass fibers with the prematrix under continuous stirring, until the fibers are completely uniformly distributed (BMC production). No particular procedures or special materials or measures are necessary in the obtaining of the prematrix-reinforcing material composite.

The obtaining of the pre-moulding material-specific B-state of these pre-products follows by maturation, preferably at room or elevated temperature.

The storage of these products can be carried out at room temperature or preferably at a temperature below +15° C. The mouldability is then more than 3 months and possibly up to one year.

The processing of these premoulding materials can be conducted in conventional manner, for example by hot-compression moulding and air jack procedures. The technology itself can be realised in conventional manner. It can be conducted e.g. under the conditions similar to the UP-SMC procedure. The resultant parts, in particular the fiber composite types, are high-strength unmeltable products having high temperature resistance and favourable burning properties. Such moulding materials are particularly suitable for use in areas having high flame safety requirements and high demands on heat stability, for example in automobile construction as protection against heat, corrosion and noise in the exhaust region, in public transport as seating components as well as interior furnishing components, in the building industry as exterior and interior panelling and the like.

The following Examples illustrate the invention:

EXAMPLE I

Production of a condensation resin 112.28 parts by wt. phenol and 58.2 parts by wt. formaldehyde were introduced into a reactor, heated at 58° C. and mixed within 2 hours with 0.39 parts by wt. NaOH while maintaining the temperature constant at 58° C. The temperature was then increased to 80° C. and maintained until the desired viscosity was reached. The reaction mixture was then cooled to 40° C. and the pH was adjusted to a value of 7.1 to 7.2 by the addition of acid. The resultant reaction resin is a satisfactorily flowable phenol resin having a B-duration of about 90 seconds.

Process of a prematrix 100 parts by wt. of the condensation resin were thoroughly mixed at room temperature in a mixing vessel with 4 parts by wt. water, 96 parts by wt. calcium carbonate and 2 parts by wt. zinc stearate. 24 parts by wt.

of a white cement and then 4.8 parts by wt. salicylic acid were then added to this mixture with continuous stirring and with maintenance of the original temperature. The resultant compound can be used, for example, both for the preparation of BMC bulk moulding compounds and also for the production of SMC sheet moulding compounds.

EXAMPLE II

Manufacturing of a prematrix of condensation resin, additives and adjuvants and a powder or paste based on hydraulic cement 100 parts by wt. of the phenol resol resin from Example I were thoroughly mixed together with 96 parts by wt. $CaCO_3$ and 1.8 parts by wt. zinc stearate in a mixing vessel at room temperature. This mixture was then thoroughly homogenised, with intensive stirring and maintenance of the room temperature, with 28.8 parts by wt. of a powder comprising a mixture of 24 parts by wt. cement and 4.8 parts by wt. salicylic acid, and the system was thoroughly homogenised. Aluminium hydroxide can also be used as filler.

Instead of the powder a paste can of course be used in analogous manner, comprising the appropriate amount of cement and salicylic acid, made into a paste with, for example, low viscosity polyester resin. The resultant prematrix and its consequent press material has improved quality and, in the given case, on account of the carrier used, modified properties.

EXAMPLE III

Processing of a prematrix of condensation resin, conventional additive, magnesium oxide (component of a hydraulic cement) and an alkalinity-reducing agent 100 parts by wt. of a condensation resin, prepared as in Example I, was thoroughly mixed at room temperature in a homogeniser with 3 parts by wt. water, 60 parts by wt. calcium r carbonate, 67.5 parts by wt. Al(OH)3 and 2.0 parts by wt. zinc stearate. While maintaining the original temperature, 3.9 parts by wt. magnesium oxide (in a pasty form with a carrier comprising low-molecular weight specific polyester) and 2.5 parts by wt. calcium dihydrogen phosphate were then mixed with this mixture. The resultant mixture can thicken quickly and exhibits in the B-state a prematrix having long-term storage properties.

EXAMPLE IV

Preparation of a premoulding material in amorphous form (BMC)

The prematrix of Example I was introduced continuously in an amount of 100 parts by wt. at room temperature, and with thorough distribution, into 18 parts by wt. cut glass fibers Vetrotex P-276 (the company Gewetex, Herzogenrath, Federal Republic of Germany), 0.5-5.0 cm long. The fibers have a nominal cross-section of 14 μm and are provided with an aminosilane finish. The resultant moulding material is an amorphous premoulding material having good moulding properties.

EXAMPLE V

Preparation of sheet moulding compounds with non-oriented fibers (SMC-R)

In this Example, the prematrix (PMX) from Example II was worked with a reinforcing material on a conventional SMC machine. The reinforcing material comprised cut Vetrotex textile glass roving P 276. The fiber length was about 2.5 cm. The viscosity of the Prematrix was about 55,000 mPa.s. The formation of the P-SMC band was carried out between two polyethylene films. The SMC-unit was so arranged that the speed was 2.3 m/min, the glass charge 900 g/m² and the doctor gap 0.909 mm. The resultant P-SMC web had a uniform construction, good wetting of the reinforcing material and the following composition:

Glass content=32%, resin content=29%,
Filler content=39.0%

The formation of the B-stage at room temperature takes about 4 days. The thickened material exhibits the following data, obtained with the Plastometer (SMC-Technologie Derek & Kueper OHG, Aachen):

| Homogeneity coefficient | HK59 |
| Plasticity coefficient | PE 9 |
| Characteristic speed | VC 24 μ/sec |

The operability and the rheological characteristics correspond approximately to the situation for conventional SMC products based on unsaturated polyester resins (UP). The storage stability at a temperature below +15° C. was about 1 year, and the working procedure can be conducted in similar manner to that for UP-SMC materials. Conventionally, the following process parameters apply:

$T_{implement} = 145°$ C., $P_{mass} = 60$ bar, $T_{hardening} = 1$ min/mm.

The implement geometry, average size of the press product and structure-viscosity of the material should also be considered as for UP-SMC. The pressmoulded P-SMC material (finished part) has the following properties:

| Flexural strength | 190 N/mm² |
| Tensile strength | 60 N/mm² |
| Bending E-modulus | 14,500 N/mm² |
| Drop in tensile strength at RT→140° C. | 10% |
| Barcol hardness | 69 |
| Fire class | B1 (M1) |

I claim:

1. A premoulding resin composition having an extended controllable B-stage characteristic comprising a phenol resin, a binder selected from the group consisting of a hydraulic binder, a hydraulic cement, a high-alumina hydraulic binder, calcium oxide and/or magnesium oxide mixtures with hydraulic additives, and cement mixtures with hydraulic additives and an effective amount of an agent for reducing the alkalinity to produce a premoulding resin composition having a controllable B-stage extending for a period of at least three months at room temperature.

2. The premoulding material according to claim 1, wherein the ratio of the number of the acidity equivalents of the said agent in the system to the number of the moles of water in the system is less than 2, and wherein the ratio of the number of alkalinity equivalents of the binder in the system to the number of moles of phenolic OH groups in the system is less than 0.01.

3. The premoulding material according to claim 1, wherein the binder is a hydraulic cement.

4. The premoulding material according to claim 1, wherein the binder is a high alumina-containing binder.

5. The premoulding composition according to claim 1, wherein the components of the binder are calcium oxide, magnesium oxide and alumina and silicic acid derivatives.

6. The premoulding according to claim 1, wherein the said agent is an acid or acid salt.

7. The premoulding composition according to claim 6, wherein the said agent is selected from the group consisting of oxalic acid, salicyclic acid and mixtures thereof.

8. The premoulding composition according to claim 6, wherein the said agent is calcium bis(dihydrogen phosphate).

9. A process for the preparation of a premoulding composition having an extended controllable B-stage characteristic, comprising a phenol resin, which comprises mixing about one part by wt. phenol resin with less than about 4 parts by wt. of a binder selected from the group consisting of a hydraulic binder, a hydraulic cement, a high-alumina hydraulic binder, calcium oxide and/or magnesium oxide mixtures with hydraulic additives, and cement mixtures with hydraulic additives and less than about 0.2 parts by wt. equivalent of an alkalinity-reducing agent to produce a premoulding resin composition having a controllable B-stage extending for a period of at least three months at room temperature.

10. A process according to claim 9, wherein the binder is introduced separately from the said agent.

11. The process according to claim 9, wherein the binder is introduced as powder.

12. The process according to claim 9, wherein the binder is introduced in paste form.

13. The process according to claim 12, wherein the paste contains, as carrier, a low-viscosity polyester resin having an acid number of b 0, a low viscosity epoxy resin and/or tricresyl phosphate.

14. A process according to claim 9, wherein the binder is used together with the said agent in powder or paste mixture form.

* * * * *